(12) United States Patent
Goossens et al.

(10) Patent No.: US 10,476,420 B2
(45) Date of Patent: Nov. 12, 2019

(54) BRUSHLESS DIRECT CURRENT MOTOR WITH A RING MAGNET

(71) Applicant: Dana Automotive Systems Group, LLC, Maumee, OH (US)

(72) Inventors: Stijn Goossens, Erpe-Mere (BE); Johannes van Ginkel, Melden (BE)

(73) Assignee: Dana Automotive Systems Group, LLC, Maumee, OH (US)

( * ) Notice: Subject to any disclaimer, the term of this patent is extended or adjusted under 35 U.S.C. 154(b) by 100 days.

(21) Appl. No.: 15/485,257

(22) Filed: Apr. 12, 2017

(65) Prior Publication Data

US 2017/0302207 A1  Oct. 19, 2017

Related U.S. Application Data

(60) Provisional application No. 62/321,871, filed on Apr. 13, 2016.

(51) Int. Cl.
*H02P 6/00* (2016.01)
*H02P 23/00* (2016.01)
(Continued)

(52) U.S. Cl.
CPC ....... *H02P 23/0004* (2013.01); *H02K 1/2753* (2013.01); *H02K 29/08* (2013.01); *H02P 6/08* (2013.01); *H02P 6/17* (2016.02)

(58) Field of Classification Search
CPC ...... H02K 1/2753; H02P 23/0004; H02P 6/08
See application file for complete search history.

(56) References Cited

U.S. PATENT DOCUMENTS 4,344,023 A * 8/1982 Yokobori .............. H02P 6/28
                                                      318/400.04
5,757,180 A   5/1998 Chou et al.
(Continued)

FOREIGN PATENT DOCUMENTS

DE  10339621 A1  4/2005
JP  09023686 A   1/1997
(Continued)

OTHER PUBLICATIONS

German Patent and Trademark Office, Office Action in Application 102017206437.4, dated May 14, 2018, 18 pages, Munich, Germany.
(Continued)

*Primary Examiner* — Muhammad S Islam
(74) *Attorney, Agent, or Firm* — Marshall & Mehorn, LLC

(57) ABSTRACT

Provided herein is a BLDC motor having a control system, a rotor including a motor magnet having a plurality of alternating magnetic poles thereon, a stator and a ring magnet. The ring magnet is mounted on the rotor axially adjacent the motor magnet. The number of poles on the ring magnet is an integer multiple of the number of poles on the motor magnet. Also provided is a method for controlling the BLDC motor including the steps of supplying a current to the motor, determining if the torque produced by the motor is in a positive or negative direction, determining a multiplier based on the direction of the torque, multiplying the supplied current by the multiplier, implementing a commutation sequence to provide current to the motor, measuring the current in each of the plurality of windings and adjusting the current provided to the motor based on the measured current.

10 Claims, 7 Drawing Sheets

(51) Int. Cl.
*H02P 6/17* (2016.01)
*H02K 1/27* (2006.01)
*H02K 29/08* (2006.01)
*H02P 6/08* (2016.01)

(56) References Cited

U.S. PATENT DOCUMENTS

| | | | |
|---|---|---|---|
| 5,892,339 A | 4/1999 | Park et al. | |
| 6,249,101 B1 | 6/2001 | Viti et al. | |
| 7,426,978 B2 | 9/2008 | Onizuka et al. | |
| 7,439,642 B2 | 10/2008 | Chen et al. | |
| 7,714,529 B2 | 5/2010 | Chen et al. | |
| 8,040,085 B2 | 10/2011 | Kawamura et al. | |
| 8,466,646 B2 | 6/2013 | O'Gorman et al. | |
| 8,552,715 B2 | 10/2013 | Semineth et al. | |
| 2003/0006724 A1* | 1/2003 | Getz | H02P 6/08 318/400.04 |
| 2009/0284201 A1 | 11/2009 | Jeung | |
| 2011/0248658 A1* | 10/2011 | O'Gorman | H02P 6/18 318/400.32 |
| 2012/0105055 A1 | 5/2012 | Takahashi et al. | |

FOREIGN PATENT DOCUMENTS

| | | | |
|---|---|---|---|
| JP | 2004304997 A | 10/2004 |
| JP | 2010011637 A | 1/2010 |

OTHER PUBLICATIONS

Japanese Patent Office, Office Action in Application 2017-080087, dated Apr. 11, 2018, 9 pages.

\* cited by examiner

| Prior Art | | | | BLDC 10 of FIG. 2 | | | | | Switches | | |
|---|---|---|---|---|---|---|---|---|---|---|---|
| State | H1 | H2 | H3 | State | Ring Period | H1 | H2 | H3 | U | V | W |
| 1 | 1 | 0 | 0 | 1 | 1 | 1 | 0 | 0 | − | + | 0 |
|   |   |   |   | 2 | 1 | 1 | 0 | 1 |   |   |   |
| 2 | 1 | 0 | 1 | 3 | 1 | 0 | 0 | 0 | − | 0 | + |
|   |   |   |   | 4 | 1 | 0 | 0 | 1 |   |   |   |
| 3 | 0 | 0 | 1 | 5 | 1 | 0 | 1 | 0 | 0 | − | + |
|   |   |   |   | 6 | 1 | 0 | 1 | 1 |   |   |   |
| 4 | 0 | 1 | 1 | 7 | 2 | 1 | 0 | 0 | + | − | 0 |
|   |   |   |   | 8 | 2 | 1 | 0 | 1 |   |   |   |
| 5 | 0 | 1 | 0 | 9 | 2 | 0 | 0 | 0 | + | 0 | − |
|   |   |   |   | 10 | 2 | 0 | 0 | 1 |   |   |   |
| 6 | 1 | 1 | 0 | 11 | 2 | 0 | 1 | 0 | 0 | + | − |
|   |   |   |   | 12 | 2 | 0 | 1 | 1 |   |   |   |

BRUSHLESS DIRECT CURRENT MOTOR WITH A RING MAGNET

RELATED APPLICATION

This application claims priority to U.S. Provisional Application No. 62/321,871, filed on Apr. 13, 2016, the disclosure of which is incorporated herein by reference in its entirety.

FIELD

The present invention is directed toward a BLDC motor having a ring magnet wherein the number of poles on the ring magnet is a multiple of the number of poles on the motor magnet and a method and control system for determining the position of the motor.

BACKGROUND

Brushless direct current (BLDC) motors are used in applications across many industries including automotive, aerospace, consumer, medical, industrial automation equipment and instrumentation applications. A BLDC motor includes a stator with electromagnetic poles with windings thereon and a rotor with magnet mounted on the surface thereof creating permanent magnetic poles. The stator and the rotor magnetically interact with each other when electric current flows in the windings. BLDC motors require a supply of commutated current to the windings that is synchronized to the rotor position. Phase commutation of current flowing through each of windings is performed at a proper time to form a continuous rotating magnetic field, which can be achieved as a rotor position is correctly recognized.

BLDC motors most commonly use a three-phase configuration with Hall effect sensors imbedded in the motor to define commutation positions for each phase (U, V, W). A conventional three-phase BLDC motor includes a rotor having a plurality of magnetic poles and a stator including U, V and W phase windings. A three-phase BLDC motor has six states of commutation. When all six states in the commutation sequence have been performed, the sequence is repeated to continue the rotation.

Hall effect sensors in BLDC motors are used to commutate the motor based on the change of the Hall sensor signals and for position sensing. The magnetic field sensed by the Hall effect sensors is typically generated by magnets on the rotor of the motor or an additional ring magnet. Hall effect sensors are used as cost effective solutions to sense position.

Commonly BLDC motors have three Hall effect sensors embedded into the stator on the non-driving end of the motor. When the rotor's magnetic poles pass near the Hall effect sensors, they provide a high or low signal indicating if the N or S pole is passing near the sensors. Based on the combination of three Hall effect sensors, the exact sequence of commutation can be determined.

In typical BLDC operations, two of the three phases of a BLDC motor conduct current while the other phase has zero current, i.e. a dead phase, in order for the motor to rotate. A typical three-phase BLDC motor has Hall effect sensors that indicate which two of the three phases are active (i.e. not dead). Hall states (H1, H2, H3) can be used to create a one-to-one relation with rotor phases and the direction which the voltage needs to be applied. There are six possible Hall phase combinations which cover exactly one electric period, therefore, the position resolution using the three phase Hall effect sensors is limited to one sixth of an electric period.

In view of the foregoing disadvantages, it would be advantageous to have a BLDC motor that uses Hall effect sensors and a ring magnet to provide improved resolution position sensing.

SUMMARY

Provided herein is a BLDC motor having a control system, a rotor, a stator and a ring magnet. The rotor includes a rotor core having a radially inner surface and a radially outer surface, a shaft drivingly connected to the rotor core and a motor magnet having a radially outer surface, a radially inner surface and a plurality of alternating magnetic poles thereon, wherein the motor magnet is positioned on the radially outer surface of the rotor core. The stator has a central annular portion defining an aperture, an outer annular portion, a plurality of pole arms with radially windings thereon and a set of sensors in electrical communication with the control system, wherein the pole arms extend from the central annular portion to the outer annular portion and wherein the sensors extend from central annular portion to the outer annular portion. The ring magnet is mounted on the rotor axially adjacent the motor magnet and has a plurality of alternating magnetic poles, wherein the number of poles on the ring magnet is an integer multiple of the number of poles on the motor magnet.

Provided herein is a method for controlling a position of a rotor of a brushless direct current motor, the method including providing a brushless direct current motor including a rotor, a stator, a motor magnet having a number of magnetic poles thereon mounted to the rotor and a ring magnet mounted on the rotor axially adjacent the motor magnet having a number of magnetic poles thereon, wherein the stator includes a plurality of windings and a plurality of sensors and wherein the number of poles on the ring magnet is twice the number of poles on the motor magnet; supplying a current to the motor; determining if the torque produced by the motor is in a positive or negative direction; determining a multiplier based on the direction of the torque; multiplying the supplied current by the multiplier; implementing a commutation sequence to provide current to the motor; and measuring the current in each of the plurality of windings.

BRIEF DESCRIPTION OF THE DRAWINGS

The above, as well as other advantages of the present embodiments, will become readily apparent to those skilled in the art from the following detailed description when considered in the light of the accompanying drawings in which.

DETAILED DESCRIPTION OF THE PREFERRED EMBODIMENTS

Figure 1:
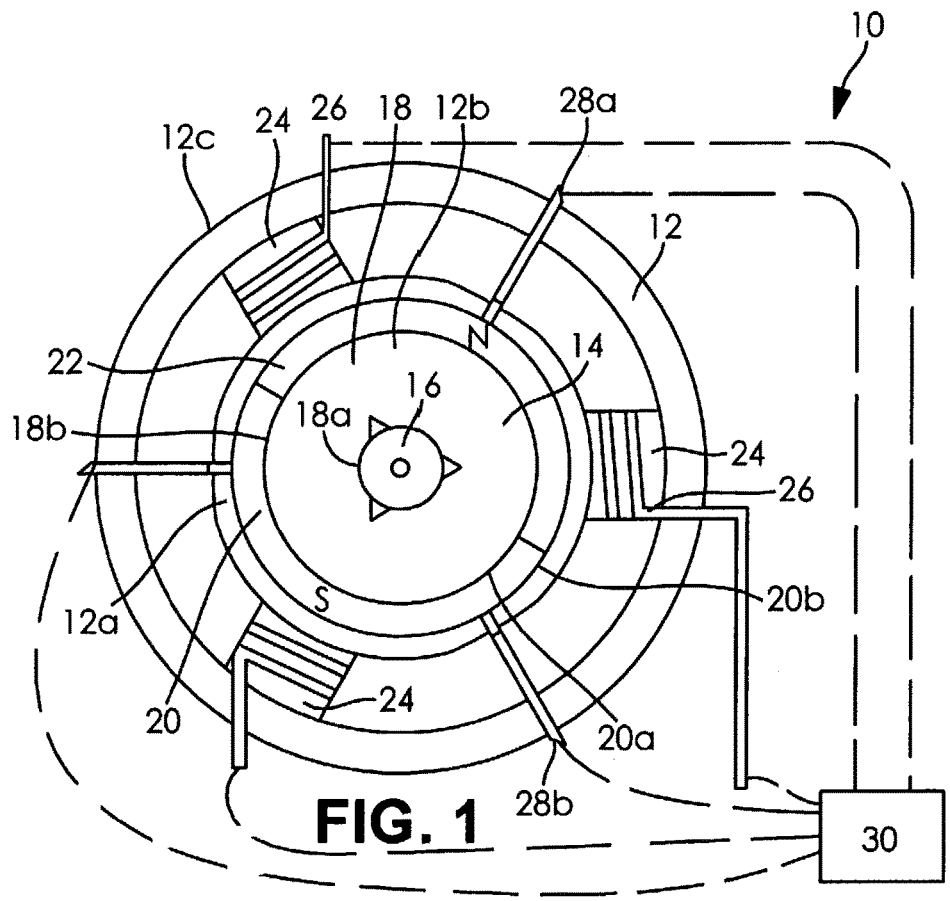
FIG. 1 is a schematic top view of a preferred embodiment of a BLDC motor.

It is to be understood that the preferred embodiments may assume various alternative orientations and step sequences, except where expressly specified to the contrary. It is also to be understood that the specific devices and processes illustrated in the attached drawings, and described in the following specification are simply exemplary embodiments of the inventive concepts defined in herein. Hence, specific dimensions, directions or other physical characteristics relating to the embodiments disclosed are not to be considered as limiting.

Those of skill will recognize that the various illustrative logical blocks, modules, circuits, strategies, schemes, and algorithm steps described in connection with the embodiments disclosed herein, including with reference to the control system described herein, for example, is optionally implemented as electronic hardware, software stored on a computer readable medium and executable by a processor, or combinations of both.

To clearly illustrate this interchangeability of hardware and software, various illustrative components, blocks, modules, circuits, strategies, schemes, and steps have been described above generally in terms of their functionality. Whether such functionality is implemented as hardware or software depends upon the particular application and design constraints imposed on the overall system. Skilled artisans could implement the described functionality in varying ways for each particular application, but such implementation decisions should not be interpreted as causing a departure from the scope of the present embodiments. For example, various illustrative logical blocks, modules, strategies, schemes, and circuits described in connection with the embodiments disclosed herein is optionally implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor is optionally a microprocessor, but in the alternative, the processor is optionally any conventional processor, controller, microcontroller, or state machine. A processor is also optionally implemented as a combination of computing devices, e.g., a combination of a DSP and a microprocessor, a plurality of microprocessors, one or more microprocessors in conjunction with a DSP core, or any other such configuration.

Software associated with such modules optionally resides in RAM memory, flash memory, ROM memory, EPROM memory, EEPROM memory, registers, a hard disk, a removable disk, a CD-ROM, or any other suitable form of storage medium known in the art. An exemplary storage medium is coupled to the processor such that the processor is capable of reading information from, and writing information to, the storage medium. In the alternative, the storage medium is optionally integral to the processor. The processor and the storage medium optionally reside in an ASIC. For example, in one embodiment, a controller for use of control of the motor includes a processor (not shown).

In some embodiments, the control system herein includes a digital processing device, or use of the same including one or more hardware central processing units (CPU) that carry out the system's functions. In still further embodiments, the digital processing device further includes an operating system configured to perform executable instructions. In some embodiments, the digital processing device is optionally connected to a computer network. In further embodiments, the digital processing device is optionally connected to the Internet, a cloud computing infrastructure, an intranet or a data storage device.

In accordance with the description herein, suitable digital processing devices include, by way of non-limiting examples, server computers, desktop computers, laptop computers, notebook computers, handheld computers, Internet appliances, mobile smartphones and tablet computers. In some embodiments, the digital processing device includes an operating system configured to perform executable instructions. The operating system is, for example, software, including programs and data, which manages the device's hardware and provides services for execution of applications.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile. In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the control system for the motor disclosed herein includes at least one computer program, or use of the same. A computer program includes a sequence of instructions, executable in the digital processing device's CPU, written to perform a specified task. Computer readable instructions are optionally implemented as program modules, such as functions, objects, Application Programming Interfaces (APIs), data structures, and the like, that perform particular tasks or implement particular abstract data types. In light of the disclosure provided herein, those of skill in the art will recognize that a computer program is optionally written in various versions of various languages.

The functionality of the computer readable instructions are optionally combined or distributed as desired in various environments. In some embodiments, a computer program includes one sequence of instructions. In some embodiments, a computer program includes a plurality of sequences of instructions. In some embodiments, a computer program is provided from one location. In other embodiments, a computer program is provided from a plurality of locations. In various embodiments, a computer program includes one or more software modules.

In some embodiments, the digital processing device includes an operating system configured to perform executable instructions. The operating system is, for example, software, including programs and data, which manages the device's hardware and provides services for execution of applications As depicted in FIG. 1, in one preferred embodiment a BLDC motor 10 has a stator 12 and a rotor 14 which is rotatable relative to stator 12 to convert electrical power to mechanical power. The rotor 14 includes a shaft 16, a rotor core 18 and a motor magnet 20. The rotor core 18 has a radially inner surface 18a and a radially outer surface 18b. The rotor core 18 is connected to the shaft 16 on the inner surface 18a thereof. The shaft 16 is a rotary shaft. In some embodiments, the shaft 16 is coupled to a driving shaft (not illustrated) of the motor 10. The motor magnet 20 is generally ring-shaped and positioned on the outer surface 18b of the rotor core 18. The motor magnet 20 has a radially outer surface 20b facing the inner surface of the stator 12 such that the rotor 14 may have induction with the stator 12 and, thus, the motor magnet 20 rotates within the stator 12. In some embodiments, the motor magnet 20 includes a set of permanent magnets 22 forming alternating disposed magnetic poles, i.e., N pole and S pole. The magnets 22 are evenly spaced circumferentially about the rotor core 18. In one embodiment, as shown in FIG. 1, the motor magnet 20 is composed of two magnetic poles N, S; however, the number of poles can vary depending on the application of the motor 10.

In some embodiment, the stator 12 includes a central annular portion 12a defining a central aperture 12b which the rotor 14 fits within. A plurality of pole arms 24 with radial windings 26 wound therearound extend from central annular portion 12a toward an outer annular portion 12c. The windings 26 are switchably driven according to a sequence which must be synchronized with the instantaneous position of the rotor 18 by a control system 30. In some embodiments the control system 30 includes a controller (not shown). In one preferred embodiment, the pole arms 24 are positioned circumferentially equidistant from each other around annular portion 12a. In some embodiments, as depicted in FIG. 1, the motor 10 has three pole arms 24 positioned therein; however, other numbers of pole arms 24 are possible depending on the application of the motor 10.

In some embodiments, the stator 12 has a set of sensors 28a, 28b, 28c positioned circumferentially equidistant from each other, extending from the central annular portion 12a to the outer annular portion 12c as shown in FIG. 1. In one preferred embodiment, the sensors 28a, 28b, 28c are positioned 120 mechanical degrees equidistant from each other and each sensor is positioned equidistant between two pole arms 24. The sensors 28a, 28b, 28c can be, but are not limited to, magnetic sensors, for example, Hall effect sensors or coils. The sensors 28a, 28b, 28c are in electric communication with the control system 30. The Hall effect sensors 28a, 28b, 28c provide discrete signals indicative of the states of the motor 10 to the control system 30 to indicate position of the rotor 14 with the stator 12. The control system 30 is also in communication with a voltage source (not shown). The speed of the motor 10 can be adjusted by the control system 30 by varying the supply of voltage to the motor 10.

In some embodiments, the control system 30 controls the motor commutation process and the current supplied to the stator 12 of the motor 10 such that it controls the position of the rotor 18 relative to the stator 12. The control system 30 can vary other parameters of the motor 10 including, but not limited to, voltage. The current in the stator windings 26 generate a magnetic field, which produces torque by interaction with the permanent magnets 22 on the motor magnet 20 pushing the rotor 18 to rotate about the shaft 16 to a new position.

Figure 2:
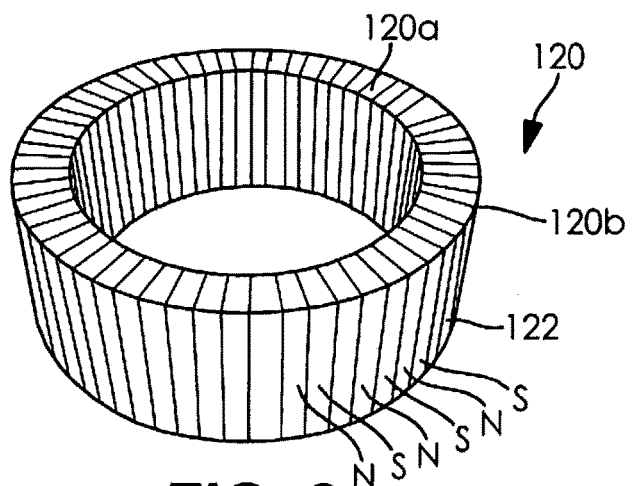
FIG. 2 is a schematic perspective view of a preferred embodiment of a ring magnet.
Figure 3:
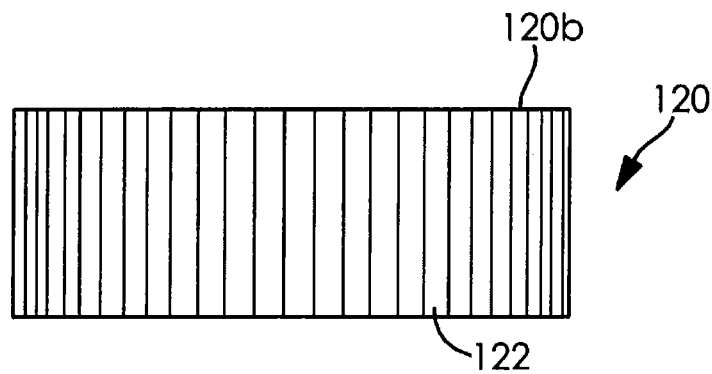
FIG. 3 is schematic side view of the ring magnet of FIG. 2.
Figure 4:
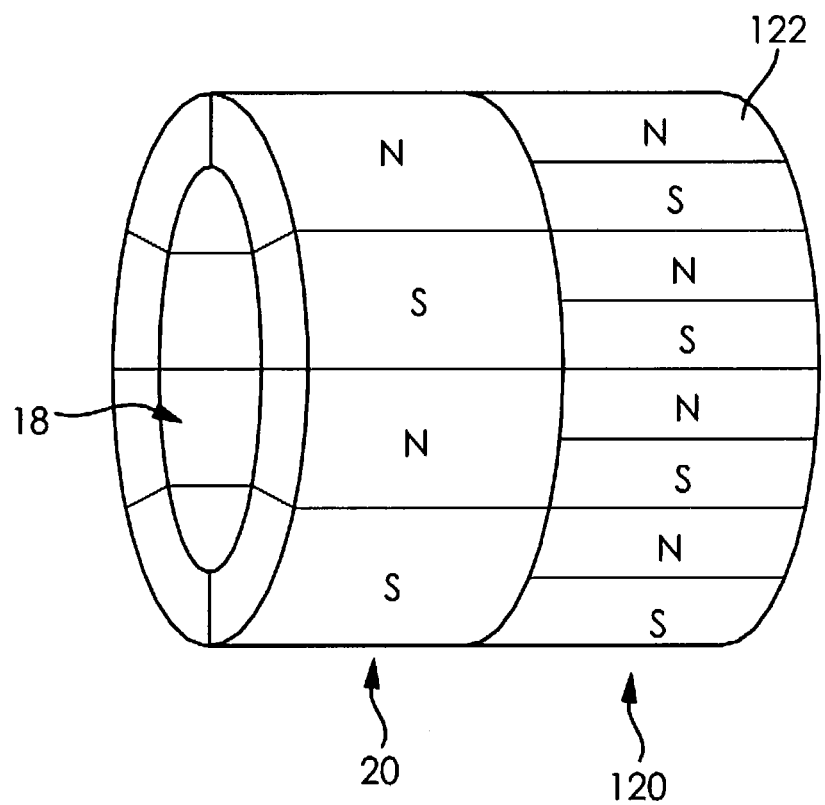
FIG. 4 is a schematic perspective view of a preferred embodiment of a ring magnet and a motor magnet of a BLDC motor.

In some embodiments, the motor 10 includes a generally cylindrical ring magnet 120 having a radially inner 120a and a radially outer surface 120b, as shown in FIG. 2, having a number of poles that is an integer (N) multiple of the number of poles on the motor magnet 20. In a preferred embodiment, the ring magnet 120 is mounted on the rotor 14. The inner surface 120a of the ring magnet 120 is positioned on the outer surface of the rotor core 18, axially next to the motor magnet 20, as shown in FIG. 4.

Each ring magnet 120 has a plurality of magnetic poles 122 which alternate from north (N) pole to a south (S) pole. In some embodiments, each pole 122 is of equal size and shape. In one embodiment, for example, the ring magnet 120 will have 20 magnets poles and the motor magnet 10 will have 10 poles. However, it is understood that ring magnet 120 can have any integer (N) multiple of the number of poles on the motor magnet 20, (i.e. poles of ring magnet=N*poles of motor where N is an integer greater than 1).

Figure 5:
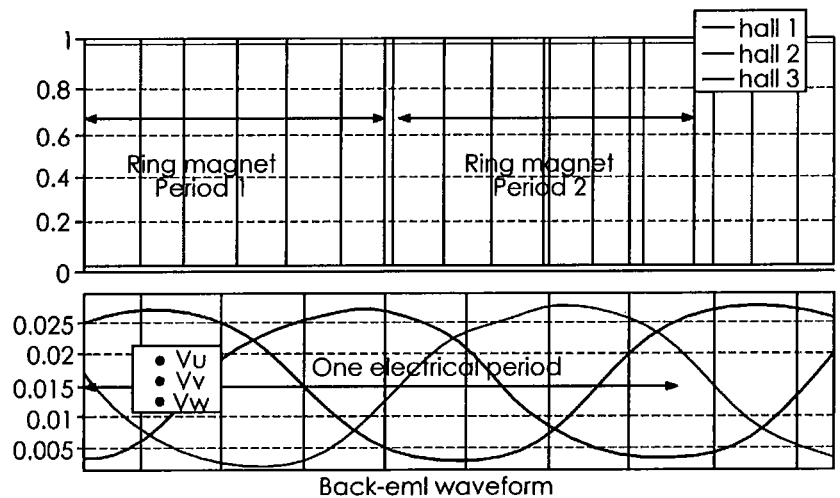
FIG. 5 is a chart illustrating the relationship between Hall states and phase voltages for a preferred embodiment of a BLDC motor and a prior art BLDC motor.

By increasing the number of poles 122 on the ring magnet 120 compared to the motor magnet 20, there is no longer a one-to-one relationship between the Hall state (i.e. H1, H2, H3) and the phase voltage. For example, for a ring magnet 120 having twice the number of poles than the motor magnet 20, one Hall state can correspond with two possible phase combinations as shown in FIG. 5. Therefore, to determine the position of the motor 10 the control system 30 must take into account which ring period the motor is in.

Figure 6:
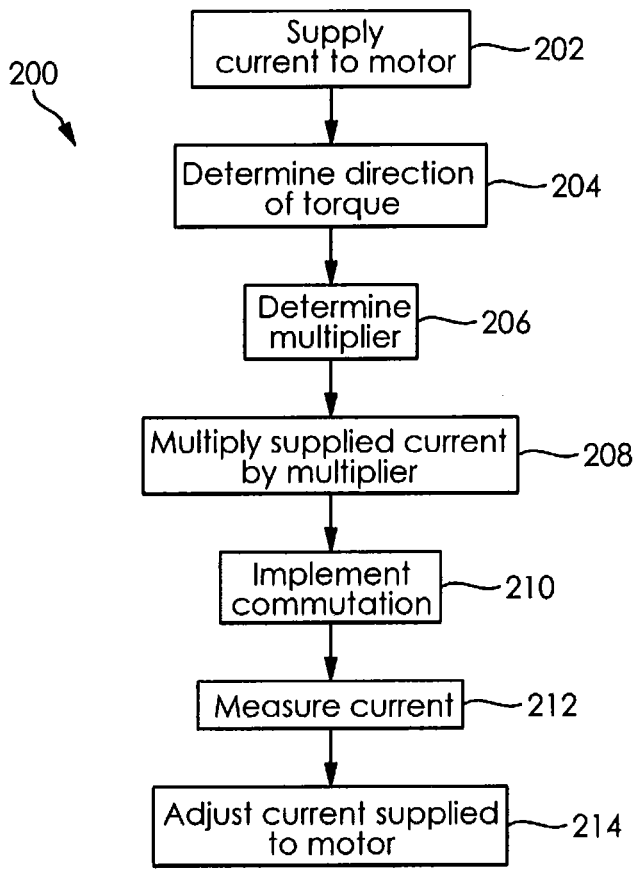
FIG. 6 is a block diagram of a preferred embodiment of a control system for a BLDC motor.

In one embodiment, the control system 30 performs a method for controlling the position of the motor 200 that includes the steps of supplying a current to the motor 202, determining if the torque produced by the motor 10 is in a positive or negative direction 204, determining a multiplier based on the direction of the torque 206, multiplying the supplied current by the multiplier 208, implementing a commutation sequence providing current to the motor 210 and measuring the current in each of the plurality of windings 212 as shown in FIG. 6. In some embodiments, the control system 30 further implements the step of adjusting the current supplied to the motor 10 to control the position of the motor 214.

Figures 7, 8:
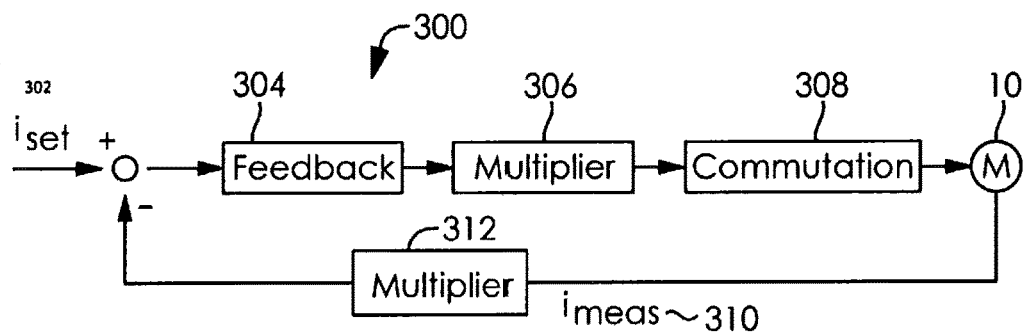
FIG. 7 is a graph depicting the ring periods of the ring magnet and the motor magnet of FIG. 4 during one electrical period.
FIG. 8 is a block diagram of a preferred embodiment of a method for controlling the current for a BLDC motor implemented by a preferred embodiment of a control system.

In order to control the position of the rotor 18, the control system 30 must take into account which ring period the motor 10 is in and, thus, create a one-to-one relation between Hall state and phase voltages. If a ring magnet has the same number of poles as the motor magnet has, there is one ring period during one electrical period. By increasing the number of poles 122 on the ring magnet 120, the number of ring periods per electrical period increases. For example, a ring magnet 120 having twice the number of poles than a motor magnet 20, results in two ring periods in one electrical period as shown in FIG. 7. In one embodiment, by taking into account which ring period the motor 10 is in, the control system 30 provides a positive current setpoint to the motor 10 resulting in a positive torque over the full electrical period of the motor 10, and correspondingly, provides a negative current setpoint resulting in negative torque over the full electrical period of the motor 10. In other embodiments, the control system 30 can control various parameters of the motor 10 including, but not limited to, voltage.

One method for controlling the current of the motor 300, is depicted in FIG. 8. In this embodiment, the ring period of the motor 10 determines the sign (i.e. negative or positive) of a multiplier used in a multiplier module 306. When the control system 30 supplies a set current $i_{set}$ to the motor 10, the control system 30 uses a feedback module 304 to adjust the current supplied to the motor 10 based on the signals received from the Hall effect sensors $i_{meas}$. Next, the multiplier module 306 multiplies the output of the feedback module 304 by a multiplier depending on the ring period the motor 10 is in. In one embodiment, the multiplier is 1 for the first ring period and −1 for the second ring period. The multiplier module 306 provides a current signal to a commutation module 308 in the desired positive or negative direction. For example, a motor 10 having a ring magnet 120 with twice the number of poles than motor magnet 20, to achieve a positive torque for the motor 10, the second period of the ring magnet 120 needs to have a negative current measurement and the first period needs to have a positive current measurement or vice versa. The commutation module 308 then provides an electric current to the motor 10 in the correctly commutated sequence and direction to control the motor 10. The control system 30 next receives signals from the Hall effect sensors of the measured current values 310 and in a second multiplier module 312 uses the multiplier 312 and the measured current values $i_{meas}$ 310 to provide an adjusted current measurement into the feedback module 308 to control the current supplied to the motor 10.

Figure 9:
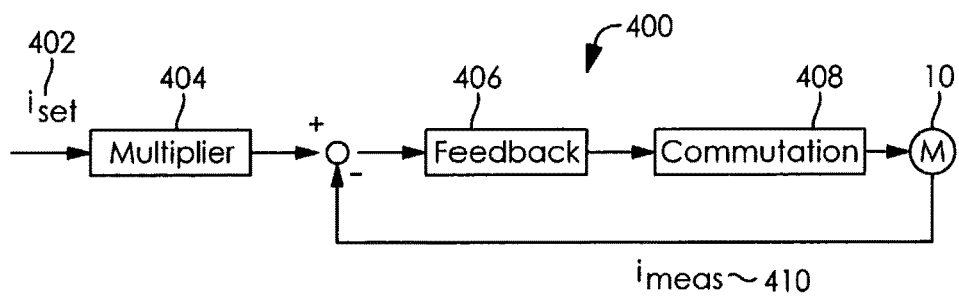
FIG. 9 is a block diagram of another preferred embodiment of a method for controlling the current for a BLDC motor implemented by a preferred embodiment of a control system.

In another embodiment, depicted in FIG. 9, the control system 30 performs a method for controlling the current of the motor 400. In this method, the control system 30 supplies a current $i_{set}$ 402 to a multiplier module 404. The multiplier module 404 multiplies the set current $i_{set}$ by a multiplier depending on the ring period which the motor 10 is in. The multiplier module 404 provides a current signal to a feedback module 406 having the desired positive or negative direction depending on the ring period the motor is in. The feedback module 406 uses feedback control to adjust the current supplied to the motor 10 based on the signals received from the Hall effect sensors $i_{meas}$. The commutation module 408 then provides an electric current to the motor 10 in the correctly commutated sequence and direction to control the motor 10. The control system 10 next receives in signals from the Hall effect sensors of the measured current values 410. The control system 30 then inputs the measured current values 410 back into feedback module 404 to control and adjust the position of the motor 10 based on the measured current values $i_{meas}$. In one embodiment, the multiplier is 1 for the first ring period and −1 for the second ring period.

In some embodiments, as discussed above, the control system 30 includes a feedback module 304, 406. The feedback module 304, 406 sets and adjusts the current supplied to the motor 10 based on the measured current values $i_{meas}$. A non-limiting example of a feedback module 304, 406 includes an output proportional-integral (PI) controller. Other feedback modules can use other control methods including, but not limited to, model predictive control, hysteresis control, and proportional-integral-derivative control. Proportional-integral-derivative (PID) controllers typically iteratively adjusts one or more parameters of the motor 10 (e.g., current, voltage, etc.) to correctly minimize a difference (e.g., error) between a measured process variable and a desired setpoint by determining a corrective action that adjusts the process.

Figure 10:
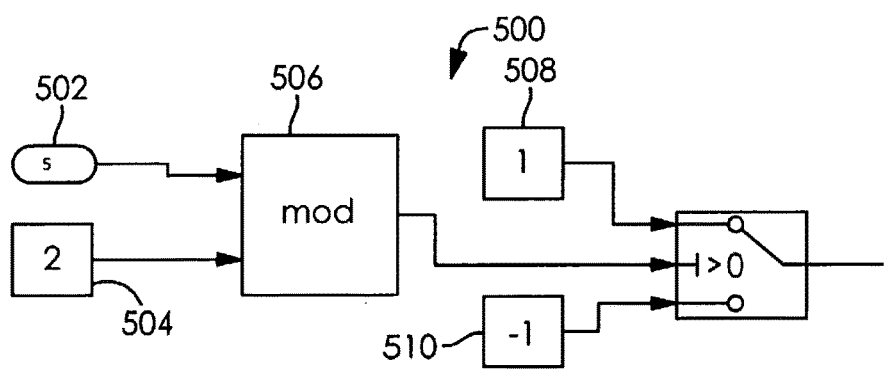
FIG. 10 is a block diagram of a preferred embodiment of a method for determining the direction of the torque implemented by a preferred embodiment of a control system.

In some embodiments, the control system 30 determines the direction of the torque of the motor 204 to determine which ring period the motor is in. The step of determining whether the torque is positive or negative 204 includes determining the number of ring periods 502 and the ratio of the number of poles on the ring magnet to the number of the poles on the motor magnet 504. One method for determining the whether the torque is positive or negative 204 is depicted in FIG. 10. The control system 30 implements the method 204 by using the known number of ring periods 502 and dividing it by the ratio of the number of poles on the ring magnet to the number of the poles on the motor magnet 504 or performing a modulus function 506. Once the ring period is determined 506, the control system 30 uses the multipliers associated with each ring period 508, 510 to control the current supplied to the motor 300, 400. For example, in one embodiment, the multiplier is 1 for the first ring period and −1 for the second ring period.

When the control system 30 and motor 10 are initialized it is unknown what ring period the motor 10 is in. Therefore, it is unknown what the value the multiplier (i.e. 1 or −1) should be issued to for a ring period in the multiplier modules 306, 404 resulting in an unknown direction of torque when current is initially supplied to the motor 10. For example, if the ring magnet 120 has twice the number of poles than the motor magnet 20, a positive current can lead to both a positive or negative torque. Therefore, the control system 30 performs a detection algorithm during start-up of the motor 10 and control system 30 to identify the sign of the gain (i.e. the multiplier) of the control system 30.

Figure 11:
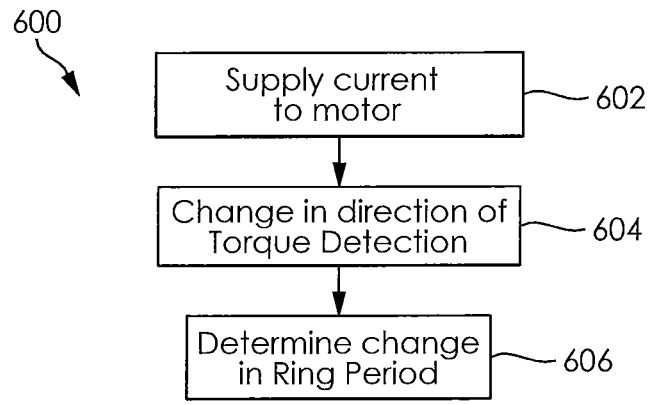
FIG. 11 is a block diagram of a preferred embodiment of a method for determining the value of a multiplier implemented by a preferred embodiment of a control system.

The detection algorithm 600 can rely on various methods to identify if the torque produced by a set current $i_{set}$ is in a positive or negative direction and, thus, the sign of gain of the control system 30. To do so, upon initialization, the control system 30 supplies a set current $i_{set}$ to the motor 602 and an initial change of direction of torque of the motor is detected 604. The current at which the direction of the torque of the motor 10 changes is equivalent to when the motor 10 enters into another ring period 606 as depicted in FIG. 11. The change in direction of torque can be detected using various methods.

Figure 12:
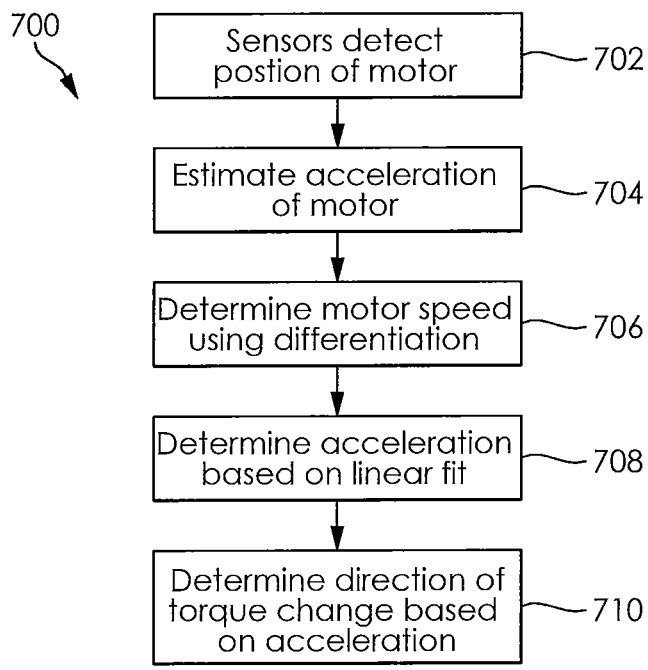
FIG. 12 is a block diagram of a preferred embodiment of a method for detecting a change in the direction of the torque implemented by a preferred embodiment of a control system.

In one embodiment, the control system 30 detects the change in direction of torque using an acceleration detection method 700 as depicted in FIG. 12. The acceleration detection method 700 is a rapid method providing a direct relation between the acceleration detected and the direction of the produced torque. The acceleration detection method 700 provides instantaneous detection without needing to wait until a steady state is achieved by the motor 10 or the control system 30. Several algorithms can be used detect the acceleration of the motor 10 including, but not limited to, a Kalman filtering algorithm, differentiation, curve fits, etc. In some embodiments, the Hall effect sensors 28a, 28b, 28c are used to sense the position of the motor 702 and the acceleration is estimated based on the position information provided by the sensors 704. In embodiments, encoders (not shown) are used to determine the position of the motor 10 and are used to estimate the acceleration. The control system 30 detects the change in direction of torque using a limited number of samples of motor position. A measure of motor speed is then obtained by differentiation 706. A linear curve fit is performed on the speed estimation such that the slope of this linear fit to determine of the motor acceleration 708 and the system correlates the change in acceleration to the direction of torque 710.

Figure 13:
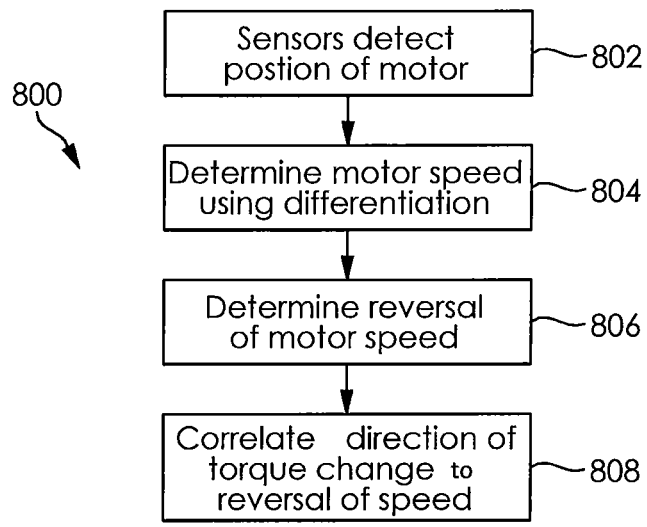
FIG. 13 is a block diagram of another preferred embodiment of a method for detecting a change in the direction of the torque implemented by a preferred embodiment of a control system.

In one embodiment, the control system 30 detects the change in direction of torque using a motor speed detection method 800 as depicted in FIG. 13. The motor speed detection method 800 is a slow, but robust method. The motor speed detection method 800 detects when the motor 10 rotates in the reverse direction. In some embodiments, the Hall effect sensors are used to sense the position of the motor 802. In some embodiments, encoders (not shown) are used to determine the position of the motor 10. A measure of motor speed is then obtained by differentiation 804. Once a reversal of rotation is detected 806, the control system 30 determines that that the sign of the gain has also been reversed 808 and, thus, the motor has entered a new ring period. The motor speed detection method 800 requires the motor 10 to run for a certain amount of time before the motor 10 begins rotating in the reverse direction.

Figure 14:
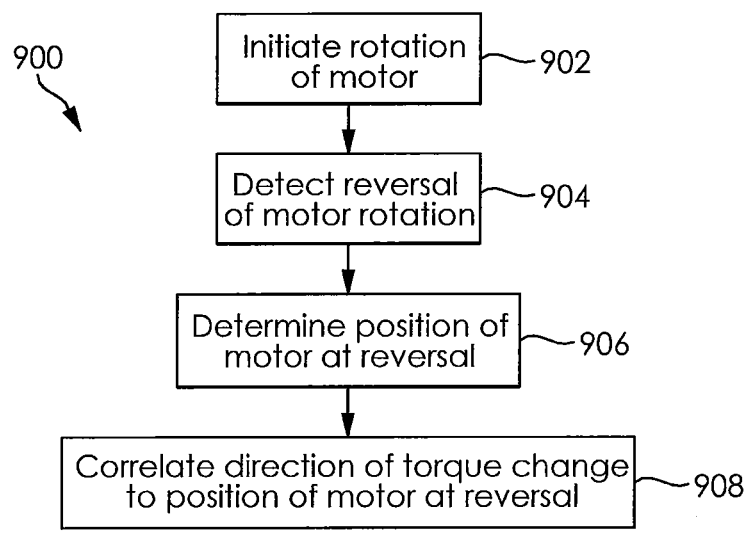
FIG. 14 is a block diagram of another preferred embodiment of a method for detecting a change in the direction of the torque implemented by a preferred embodiment of a control system

In some embodiments, the control system 30 detects the change in direction of torque using a motor position monitoring method 900 as depicted in FIG. 14. The motor position monitoring method 900 initiates rotation of the motor 902 and when the motor beings to rotate in an opposite 904, the position of the motor can be detected 906 and the control system 30 determines the position when the sign of the gain of has reversed 908. In some embodiments, the Hall effect sensors 28*a*, 28*b*, 28*c* are used to sense the position of the motor 10. In some embodiments, encoders (not shown) are used to determine the position of the motor 10.

Once a reversed sign gain is detected by the methods 700, 800, 900 discussed above, the control system 30 can change the sign of the multiplier, accordingly.

Once the control system 30 determines which ring period the motor 10 is in, i.e. the multiplier to use, the control system 30 can use the methods 300, 400 discussed above to control the position of the rotor 18 using current or other motor parameters.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed:

1. A method for controlling a position of a rotor of a brushless direct current motor, the method comprising:

providing a brushless direct current motor including a rotor, a stator, a motor magnet having a number of magnetic poles thereon mounted to the rotor and a ring magnet mounted on the rotor axially adjacent the motor magnet having a number of magnetic poles thereon, wherein the stator includes a plurality of windings and a plurality of sensors and wherein the number of poles on the ring magnet is twice the number of poles on the motor magnet;

supplying an initial current to the motor;

determining if a torque produced by the motor is in a positive or negative direction;

determining a multiplier based on the direction of the torque;

multiplying the initial supplied current by the multiplier to produce a current signal representative of a ring period of said motor;

utilizing the current signal to determine a commutation sequence used to selectively control a current supplied to the motor for selectively energizing at least one of the plurality of windings thereof; and measuring a current in each of the plurality of windings.

2. The method of claim 1, further comprising adjusting the current supplied to the motor based on the measured current in each of the plurality of windings.

3. The method of claim 1, wherein determining if the torque produced is in the positive or negative direction includes determining which ring period the motor is in.

4. The method of claim 1, further comprising determining the position of the rotor based on the measured current and the multiplier.

5. The method of claim 1, wherein the multiplier has a value of either 1 or −1.

6. The method of claim 2, wherein adjusting the current supplied to the motor includes using a proportional-integral control to adjust the current supplied to the motor.

7. The method of claim 3, wherein determining which ring period the motor is in includes detecting a change in the direction of the torque produced by the motor entering a new ring period.

8. The method of claim 7, wherein an acceleration detection method is utilized for detecting the change in the direction of the torque produced by the motor entering the new ring period.

9. The of claim 7, wherein a motor speed detection method is utilized for detecting the change in the direction of the torque produced by the motor entering the new ring period.

10. The method of claim 7, wherein a motor position monitoring method is utilized for detecting the change in the direction of the torque produced by the motor entering the new ring period.

* * * * *